United States Patent [19]

Cuypers

[11] Patent Number: 4,643,702
[45] Date of Patent: Feb. 17, 1987

[54] DRIVING BELT

[75] Inventor: Martinus H. Cuypers, Eindhoven, Netherlands

[73] Assignee: Gayliene Investments Limited, Great Britain

[21] Appl. No.: 770,963

[22] Filed: Aug. 30, 1985

[30] Foreign Application Priority Data

Sep. 5, 1984 [NL] Netherlands .................. 8402716

[51] Int. Cl.$^4$ .............................................. F16G 1/24
[52] U.S. Cl. ..................................... 474/242; 474/201
[58] Field of Search ............... 474/242, 201, 238, 240, 474/244, 245

[56] References Cited

U.S. PATENT DOCUMENTS 4,465,469 8/1984 Cataldo ..................... 474/242 X
4,526,559 7/1985 Smirl ........................ 474/242 X
4,533,342 8/1985 Miranti, Jr. et al. .............. 474/201

FOREIGN PATENT DOCUMENTS 0095257 11/1983 European Pat. Off. .
2643528 4/1977 Fed. Rep. of Germany .
2527723 6/1982 France .

Primary Examiner—Stephen J. Novosad
Assistant Examiner—Thuy M. Bui
Attorney, Agent, or Firm—Ostrolenk, Faber, Gerb & Soffen

[57] ABSTRACT

Driving belt, comprising at least one endless, flat, metal, carrying band for a number of transverse members which can move with respect to this band and of which the surface which is in contact with the carrying band shows a crosswise curvature, said curvature being concave (hollow).

6 Claims, 9 Drawing Figures

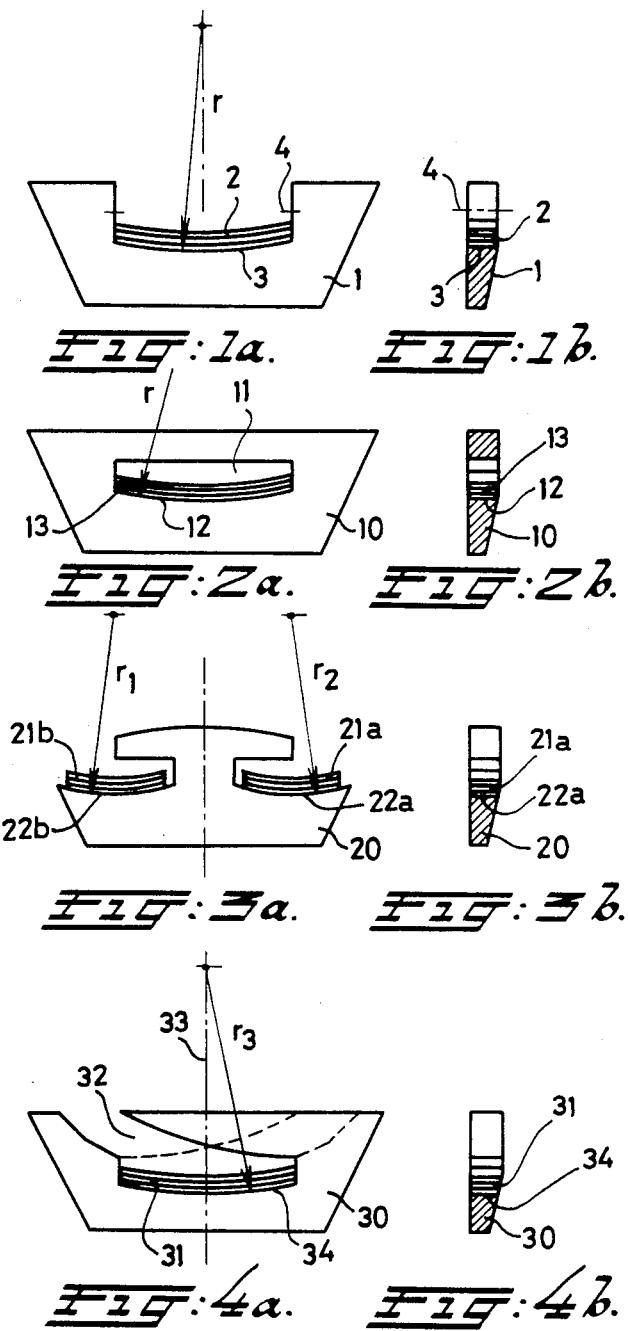

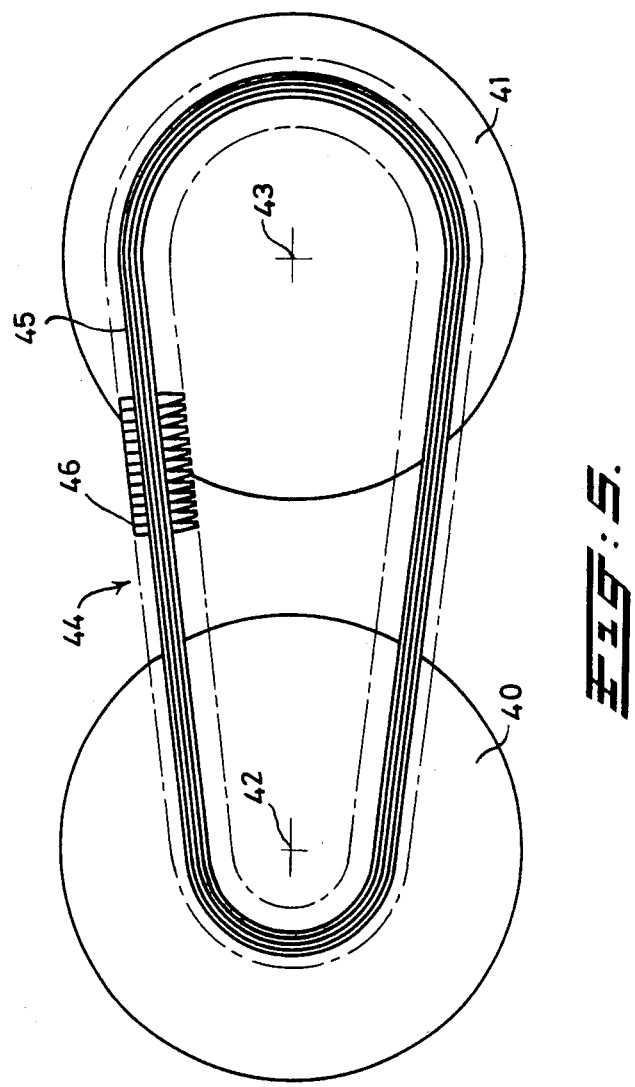

DRIVING BELT

BACKGROUND OF THE INVENTION

The invention relates to a driving belt, comprising at least one endless, flat, metal, carrying band for a number of transverse members which can move with respect to this band and of which the surface which is in contact with the carrying band shows a crosswise curvature.

Such a driving belt is known from Dutch patent application No. 75 11879.

It is well known that the carrier band of such a driving belt must be centered with respect to the band supporting surfaces provided in the transverse members. This because in transverse members provided with a single central supporting surface contact between the band with the side edges of the surface contact between the band and said edges and in a driving belt with two carrying bands, which lie at both sides of the axis of symmetry—an embodiment which has great advantages when assembling the transverse members on the carrying bands—because movement of said bands beyond the outer edges of the transverse members has a result that, when the transverse members move in between the pulleys, the band comes into contact with the pulley and is pulled out of the transverse members.

When the carrierband consists, as is usual, if a packet of thin bands, the other bands are drawn out of the transverse members too and within a very short time first the side of the driving belt and thereafter the whole driving belt is destroyed.

The abovementioned patent application proposes to obtain said centering by using supporting surface for the bands with a shape which is convex in the direction which is perpendicular to the carrying band. This is based upon the reasoning that then an effect is obtained which corresponds with the centering effect of a driving belt used in combination with and resting upon a pulley with convex curvature; the driving belt tends to move to the highest point until it remains centered there. Practice, however, has shown that the measure proposed in the above application does not always result into the desired effect: also when a convex supporting surface is used, a good centering of the carrying band or the packet of thin bands is not always ensured with the abovementioned results.

This can be explained as follows:

When the coefficient of friction between a band and the supporting surface is high, for instance in the absence of any lubrication or when the combination of the materials which are into contact with each other results into a high coefficient of friction, the centering effect is practically always there, also when the tension in the band is low. Vibrations do not influence this effect. Then the coefficient of friction is only medium and the surface is dry, then the centering effect will be there when there is a high tension in the band but vibrations will start to have a detrimental influence. When there are no tensions in the band the centering effect is only small.

When, however, the coefficient of friction between the band and the supporting surface is low, for instance when there is a good lubrication which will be the case when band and pulleys run in an oil bath or are sprayed with oil—which is necessary in a continuously variable transmission to obtain a high efficiency, and a certain measure of cooling—then with high tensions in the band the centering effect will not be reliable enough to ensure a centering under all circumstances. In practice there will always be operating conditions in which there is only little tension in the band (note that, when the transverse members are assembled on the band in such a way that there is a high initial tension this tension will drop after a number of operating hours as a result of plastic deformation and wear of the transverse members) and then the centering effect will not be present at all.

SUMMARY OF THE INVENTION

The invention aims to provide a driving belt of the type mentioned above which ensures that the carrying band will under all circumstances remain centered. To this aim the invention proposes to use, contrary to the prior art, not a convex, but a concave, thus hollow, supporting surface.

Tests have shown that as a result under all operating conditions a good centering of the carrying band is obtained. Vibrations do not have any influence at all.

The radius of curvature of the supporting surface can be between 40 and 1200 mm, preferably between 80 and 350 mm.

It is observed that the Dutch application 82 04379 proposes to provide the surface of the transfer member which lies opposite the band supporting surface, and which is intended to limit the displacement of the carrying band away from this supporting surface, with a convex curvature. The underlying idea is that under certain operating conditions there can be contact between the upper surface of the carrying band and the transverse elements, as said outer surface of the carrying band when moving between the pulleys, can crosswise obtain a concave curvature. The measure according to the invention is neither known nor obvious from this publication.

The claimed exclusive rights also include a trapeziumshaped transverse member to be used in a driving belt, with at least one endless flat carrying band, in which the surface supporting said carrying band has a crosswise curvature, said curvature being concave (hollow).

SURVEY OF THE DRAWINGS

FIG. 1A is a front view of a first embodiment of a transverse member according to the invention;

FIG. 1B is a side view of this embodiment;

FIG. 2A is a front view of a second embodiment of the transverse member according to the invention;

FIG. 2B is a side view of this embodiment;

FIG. 3A is a front view of a third embodiment according to the invention;

FIG. 3B is a side view of this embodiment;

FIG. 4A is a front view of a fourth embodiment according to the invention;

FIG. 4B is a side view of this embodiment;

FIG. 5 is a side view of a driving belt made up from transverse members according to the invention.

DESCRIPTION OF THE PREFERRED EMBODIMENTS

FIG. 1A shows a front view of a transverse member, denoted by reference numeral 1 and to be used in a driving belt which is made up from a great number of such transverse elements, which are carried on a carrying band 2 which is in most cases a packet of thin endless metal bands. This packet rests upon the supporting surface 3 and is kept in place by schematically indicated locking elements 4.

As FIG. 1A shows the supporting surface 3 has a concave, thus hollow, curvature in the longitudinal direction of the transverse member 1, thus in the transverse direction of the driving belt. It has a radius of curvature r of between 40 mm and 1200 mm, preferably between 80 mm and 350 mm. FIG. 1B shows that the band supporting surface 3 has a convex curvature crosswise of the element 1, thus in the longitudinal direction of the belt.

FIG. 2A shows a transverse member 10 with an opening 11 of which the lower edge 12 is the supporting surface for the carrier band 13. This surface 12 has a concave, thus hollow, curvature in the longitudinal direction of the element 10, thus in the transverse direction of the driving belt. Crosswise of the transverse member this surface shows a convex curvature.

FIG. 3A is a front view of a transverse element 20 with two carrying bands 21a, 21b, at both sides of the axis of symmetry of the transverse member. The assembly of a driving belt with two packets of carrying bands is simple, while the package of carring bands cannot move in the direction away from the supporting surfaces 22a, 22b. However, when one of the belts 21a, 21b moves sideways and comes into contact with one of the pulleys of the transmission, the driving belt is destroyed almost immediately. In this embodiment too, a good centering is obtained by the concave curvature of the supporting surfaces 22a, 22b respectively, with the radius of curvature r1, r2, respectively. The supporting surface has a convex curvature in the crosswise of the element—vide FIG. 3B.

FIG. 4A, finally, shows a front view of a transverse member 30 with such a shape that the packet of carrying bands 31 can be introduced through the slot 32, adjacent transverse members being mounted with the respective slots 32 alternating to the left and to the right of the axis of symmetry 33 as shown with the dotted lines. This results into a simple structure combined with a good locking of the carrying band 31 and an easy assembly. Here, too, the bandsupporting surface 34 has a concave curvature with a radius of curvature r3, and a convex curvature in the other direction—vide FIG. 4B.

FIG. 5 shows schematically and in side view a part of a continuously variable transmission with a driving belt according to the invention. Shown are the pulleys 40 and 41 with the axes 42, 43 respectively and the driving belt 44 therebetween, comprising a packet of thin endless metal bands 45 and the transverse members 46. The supporting surfaces for the carrying band 45 of the transverse members have the curvature as described above.

The radius of curvature of this supporting surface is, of course, dependent upon the thickness of the band (or of the elementary bands which together constitute the band) and the pulley radius. With a small radius, as used in transmissions for small powers, one will use a smaller radius of curvature as compared with the radius of curvature used in transmissions for greater powers. In practice a radius of curvature between 40 and 1200 mm, and particularly between 80 and 350 mm has given excellent results.

What is claimed is:

1. A driving belt, comprising at least one endless, flat, metal, carrying band for a plurality of transverse members which can move with respect to said band and wherein the supporting surface of the transverse members which are in contact with the carrying band has a crosswise radially outward concave curvature.

2. Driving belt according to claim 1, characterized in that the radius of curvature of the supporting surface is between 40 and 1200 mm.

3. Driving belt according to claim 1, characterized in that the radius of curvature of the supporting surface is between 80 and 350 mm.

4. A trapezium-shaped transverse member to be used in a driving belt, with at least one endless flat carrying band wherein the surface supporting said carrying band has a crosswise radially outward concave curvature.

5. Transverse member according to claim 4, characterized in that the radius of curvature of the supporting surface is between 40 and 1200 mm.

6. Transverse member according to claim 4, characterized in that the radius of curvature of the supporting surface is between 80 and 350 mm.

* * * * *